United States Patent [19]

Sakagami

[11] Patent Number: 5,526,091
[45] Date of Patent: Jun. 11, 1996

[54] FOCAL PLANE SHUTTER

[75] Inventor: Yasushi Sakagami, Tokyo, Japan

[73] Assignee: Nikon Corporation, Tokyo, Japan

[21] Appl. No.: 255,731

[22] Filed: Jun. 7, 1994

[30] Foreign Application Priority Data

Jun. 8, 1993 [JP] Japan .................................. 5-137644

[51] Int. Cl.⁶ .................................................. G03B 7/08
[52] U.S. Cl. ........................................ 354/431; 354/246
[58] Field of Search .................................. 354/431, 226, 354/241, 242, 245–249

[56] References Cited

U.S. PATENT DOCUMENTS

| | | |
|---|---|---|
| 3,687,026 | 8/1972 | Kobayashi et al. |
| 4,392,728 | 7/1983 | Yoshida ..................................... 354/49 |
| 4,407,574 | 10/1983 | Tomino et al. ............................ 354/50 |
| 5,323,205 | 6/1994 | Matsubara et al. ...................... 354/431 |

FOREIGN PATENT DOCUMENTS 63-150932  10/1988  Japan.

*Primary Examiner*—Michael L. Gellner
*Assistant Examiner*—Eriz Nelson
*Attorney, Agent, or Firm*—Oliff & Berridge

[57] ABSTRACT

A focal plane shutter, according to the present invention comprises a front curtain having a plurality of divided blades. One divided blade located at an end of the plurality of divided blades and forming an opening for exposure, has the photographing lens-side surface thereof formed to be a surface of reflectance lower than a predetermined rate, and each of the other divided blades than the one divided blade forming an opening for exposure, has the photographing lens-side surface thereof formed to be a surface of reflectance not lower than the predetermined rate.

4 Claims, 6 Drawing Sheets

FOCAL PLANE SHUTTER

BACKGROUND OF THE INVENTION

1. Field of the Invention

The present invention relates to a focal plane shutter for a camera, comprising a front curtain having a plurality of divided blades.

2. Description of the Related Art

Such camera is known that has an arrangement in which light passing through a photographing lens is reflected on the photographing lens-side surface of a front curtain of a focal plane shutter in the camera, the reflected light is received by a photometric light receiving device, and exposure is controlled based on the output from the light receiving device. Also, such camera is proposed that has an arrangement in which preliminary flashing is activated, the flashed light reflected on a subject is again reflected on the photographing lens-side surface of a front curtain of a shutter and received by a light receiving device, and brightness distribution is obtained from the output of the light receiving device.

In order to restrain flare that develops between the film-side surface of the shutter front curtain and the film surface, it is desirable to have the reflectance of the surface of the shutter front curtain set at not more than 2–3%. However, if photometry is to be conducted by receiving light reflected on a surface of such a low reflectance, then, because of low amount of incident light to the light receiving device, a greater light-receiving area is required of the light receiving device to increase the amount of received light, which raises a problem of efforts being disturbed for decrease in size of light receiving device. Also, if the reflectance of the surface of the shutter front curtain is low, an increased amount of the preliminary flashed light is required when measuring the distribution of reflectance of subject field, which results in an increase in the battery power consumption.

Thus, for example, such focal plane shutters have been proposed in U.S. Pat. No. 3,687,026 and Japanese Utility Model laid-open Application (JP-U-SHO-63-150932) that are adapted to prevent the flare that develops between the film-side surface of the shutter front curtain and the film surface by arranging the film-side surface of the shutter front curtain to be of a low reflectance, and, at the same time, are adapted to decrease in the size of light receiving device and decrease the light amount of the preliminary flashing by arranging the photographing lens-side surface of the shutter front curtain to be of a high reflectance.

However, in a focal plane shutter having the front and rear curtains thereof comprising a plurality of divided blades, a problem exists as shown below when adopting the systems described in the references cited above.

In such kind of focal plane shutters, each divided blade of the front curtain rubs against each other on the contact surface because each such divided blade operates while overlapping each other. In order to prevent painting on the surface of the divided blade from peeling due to such rubbing motion between the divided blades, it is desirable to select a material of low reflectance for the material of the divided blade itself, and apply no surface treatment, such as painting, on the film-side surface of the divided blade. In this case, however, a high reflectance surface is required to be formed on the photographing lens-side surface of each divided blade by surface treatment such as painting.

On the other hand, in such kind of focal plane shutters, an opening for exposure is formed between edge surfaces opposed to each other of the front and rear curtains. Thus, in the case that a divided blade of the plurality of divided blades of the front curtain, located at an end of the plurality of divided blades and forming an opening for exposure (hereinafter referred to as the opening-forming blade), has the opening-side edge surface thereof formed to be a surface of high reflectance, an undesired photograph is liable to be taken due to light reflected on such opening-side edge surface entering the film. In order to avoid this, the opening-side edge surface of the opening-forming blade is required to be formed to be a low reflectance surface, by all means.

Therefore, in the case that a surface of high reflectance is to be formed on the photographing lens-side surface of each divided blade, as described above, it is required that either painting of high reflectance is prevented from covering the opening-side edge surface of the opening-forming blade by applying a strict quality control during the manufacturing process of the opening-forming blade, or additional low reflectance painting is applied to the opening-side edge surface of the opening-forming blade after application of the high reflectance painting.

A painting process may be considered in that high reflectance painting is applied so that certain unpainted space is left on and around the edge surface of the divided blade, and, thereby, the opening-side edge surface of the opening-forming blade is not covered by the high reflectance painting. In this case, however, difference in level results between the painted surface and the unpainted material surface on the surface of the blade, which is liable to cause painting to peel off or the blade itself to be damaged due to the edge surface of a blade bumping into the portion of level difference of another blade.

SUMMARY OF THE INVENTION

An object of the present invention is to provide a focal plane shutter having the photographing lens-side surface thereof formed to a high reflectance surface, such that the manufacturing manhours are reduced, quality control is made easy for such manufacturing, and painting peel-off and blade damage are prevented.

In order to attain the object described above, a focal plane shutter according to the present invention comprises a front curtain having a plurality of divided blades. One divided blade located at an end of the plurality of divided blades and forming an opening for exposure, has the photographing lens-side surface thereof formed to be a surface of reflectance lower than a predetermined rate, and the each of other divided blades than the one divided blade forming an opening for exposure, has the photographing lens-side surface thereof formed to be a surface of reflectance not lower than the predetermined rate.

According to the present invention, the photographing lens-side surface of the opening-forming divided blade is allowed to be of a reflectance lower than the predetermined rate. Therefore, when a low reflectance material is used for the material of such divided blade in manufacturing, caution is not required such that the opening-side edge surface of the opening-forming blade is not covered by the high reflectance painting, such strict quality control as described above is not required, and additional low reflectance painting is not required for the opening-side edge surface of the opening-forming blade.

DETAILED DESCRIPTION OF THE PREFERRED EMBODIMENTS

First Embodiment

Referring to FIGS. 1–4, a first embodiment, according to the present invention, is described hereunder.

Figure 1:
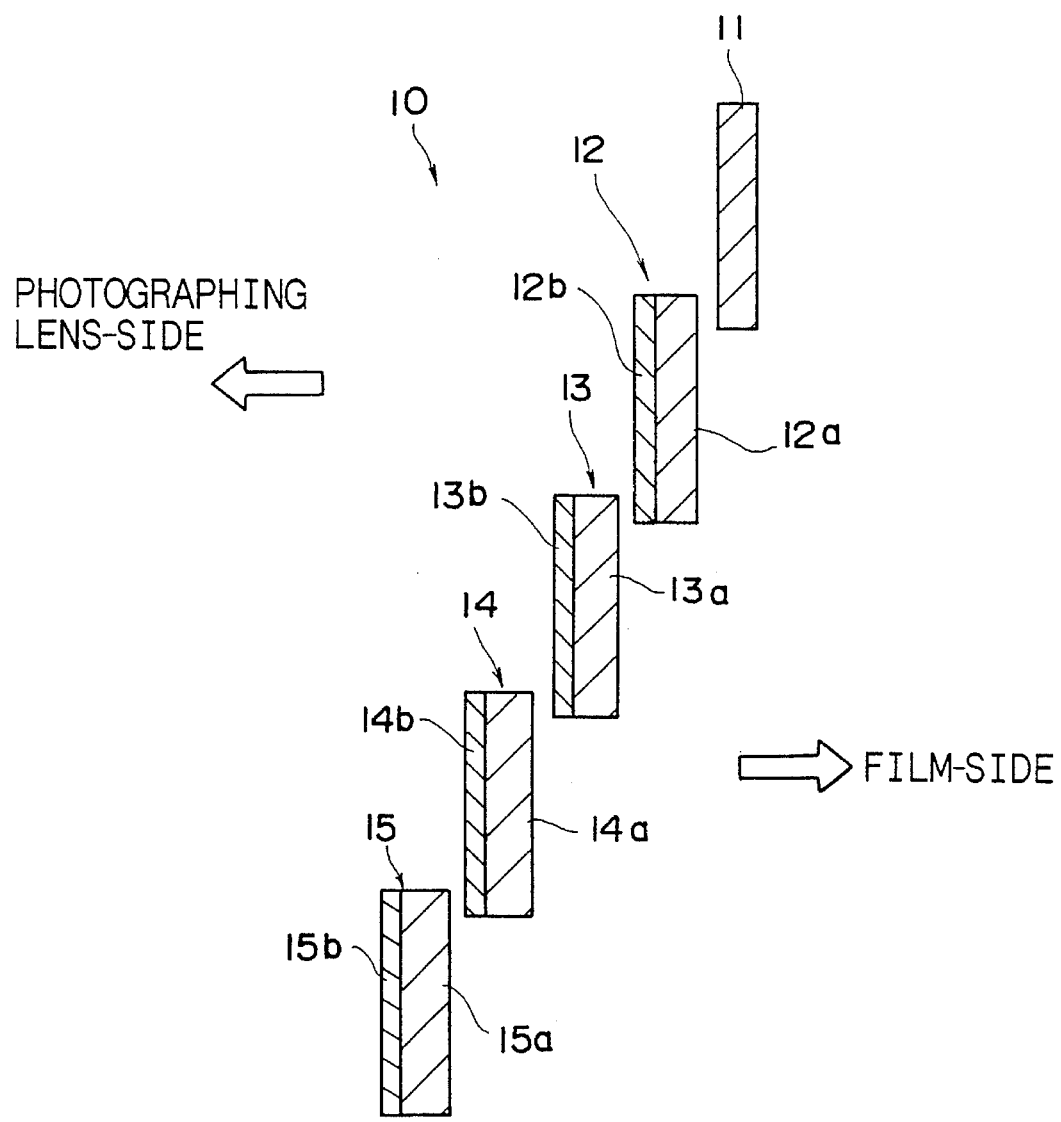
FIG. 1 is a schematic sectional illustration of divided blades forming a front curtain of a focal plane shutter, according to a first embodiment of the present invention.

FIG. 1 is a schematic sectional illustration of divided blades forming a front curtain of a focal plane shutter. This focal plane shutter 1 is disposed in front of film in a single-lens reflex camera shown in FIG. 2.

Front curtain 10 comprises five divided blades 11–15, where numeral 11 shows an opening-forming blade that forms an opening for exposure with a corresponding opening-forming blade of a rear curtain (not shown) therebetween. Blade body 11a of the opening-forming blade 11 is made of a low reflectance material, for example, FRP (Fiber glass Reinforced Plastics), in particular, CFRP using carbon fiber. No surface treatment, such as painting, is applied to either of the photographing lens-side and the film-side surfaces of the blade body. Blade bodies 12a–15a of the other divided blades 12–15 than the opening-forming divided blade 11, are also made of a low reflectance material, for example, CFRP. On the photographing lens-side surface of those blade bodies 12a–15a, high reflectance surfaces 12b–15b are formed by applying, for example, white or gray painting. Even if the high reflection rate painting happens to cover either or both edge surfaces of the other divided blades 12–15 than the opening-forming divided blade 11, light reflected on such edge surfaces would not directed to the photographing lens, thus no problems being caused.

Figure 2:
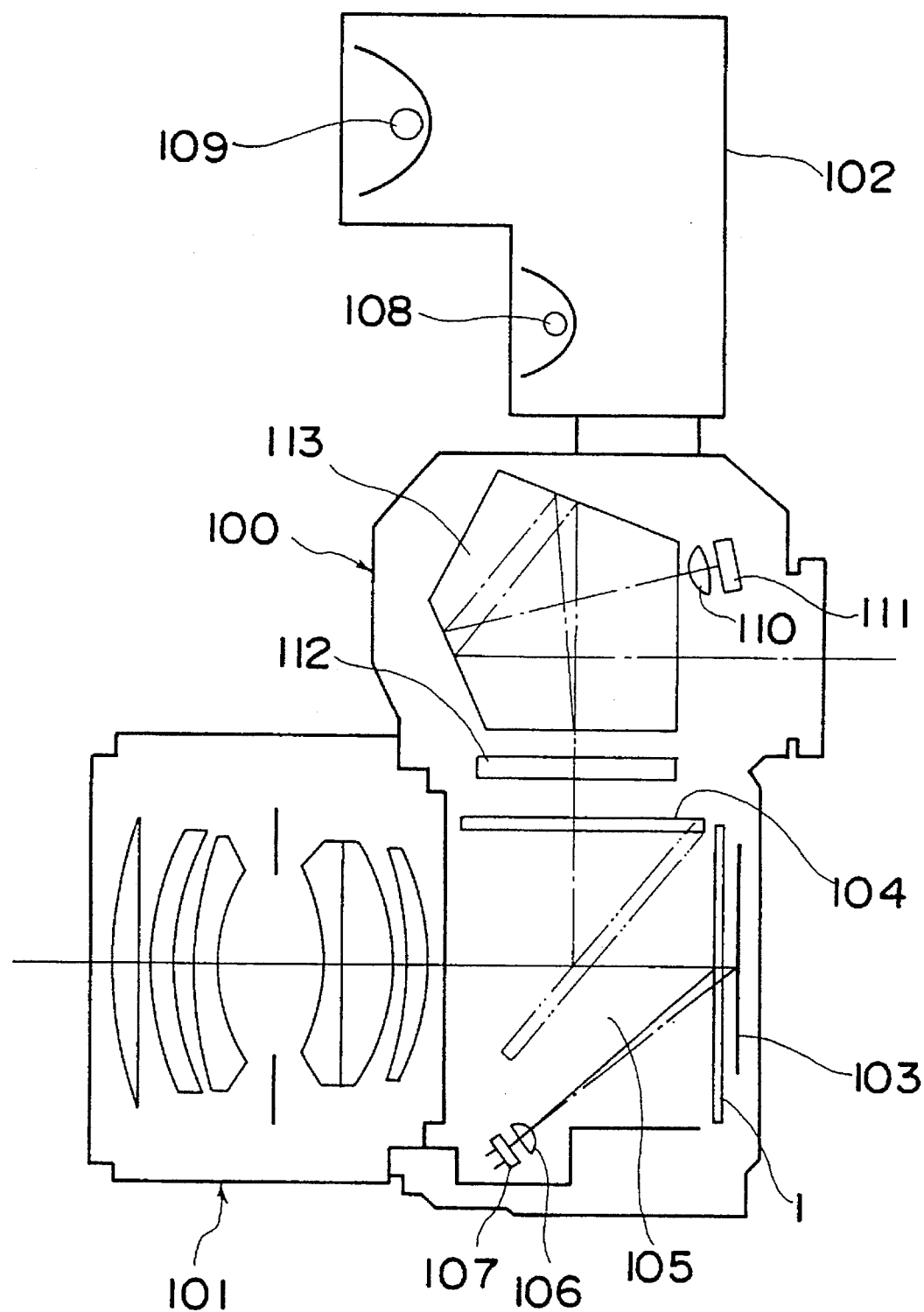
FIG. 2 is a schematic sectional illustration of a camera equipped with the focal plane shutter of the first embodiment of the present invention, and a flashlight mounted on the camera.

In FIG. 2, a photographing lens-barrel 101 and a flash 102 are mounted on a camera body 100. A condenser lens 106 and a light-adjusting light receiving device 107 are disposed at the bottom of a mirror box 105 where a quick-return mirror 104 is contained. The light-receiving face of the light receiving device 107 is divided into five regions to divide the picture frame into five regions and each divided device performs photometry for each region independently.

Disposed in a finder are a condenser lens 110, a photometric light receiving device 111, a finder screen 112, and a pentaprism 113. The light-receiving face of the light receiving device 111 is divided into five regions corresponding to the divided light-receiving face of the light receiving device 107 described above.

Operation of the present embodiment will be described.

When the quick-return mirror 104 is in the lowered position, light from the subject passes through the photographing lens-barrel 101, is reflected upwards on the quick-return mirror 104, and is received by the light receiving device 111 via the finder screen 112, the pentaprism 113 and the condenser lens 110. The light receiving device 111 outputs electric signal corresponding to the amount of received light. Exposure value is determined based on this electric signal.

Prior to flashlight photographing, under a condition where the focal plane shutter 1 is closed and the quick-return mirror 104 is in the raised position, preliminary flashing is activated at the preliminary flashing unit 108 of the flash 102. Then, the reflected light from the subject passes through the photographing lens-barrel 101, and is reflected on the photographing lens-side surface of the front curtain 10 of the focal plane shutter 1. The light reflected (diffused) on the photographing lens-side surface is received by the light receiving device 107 via the condenser lens 106.

Figure 3:
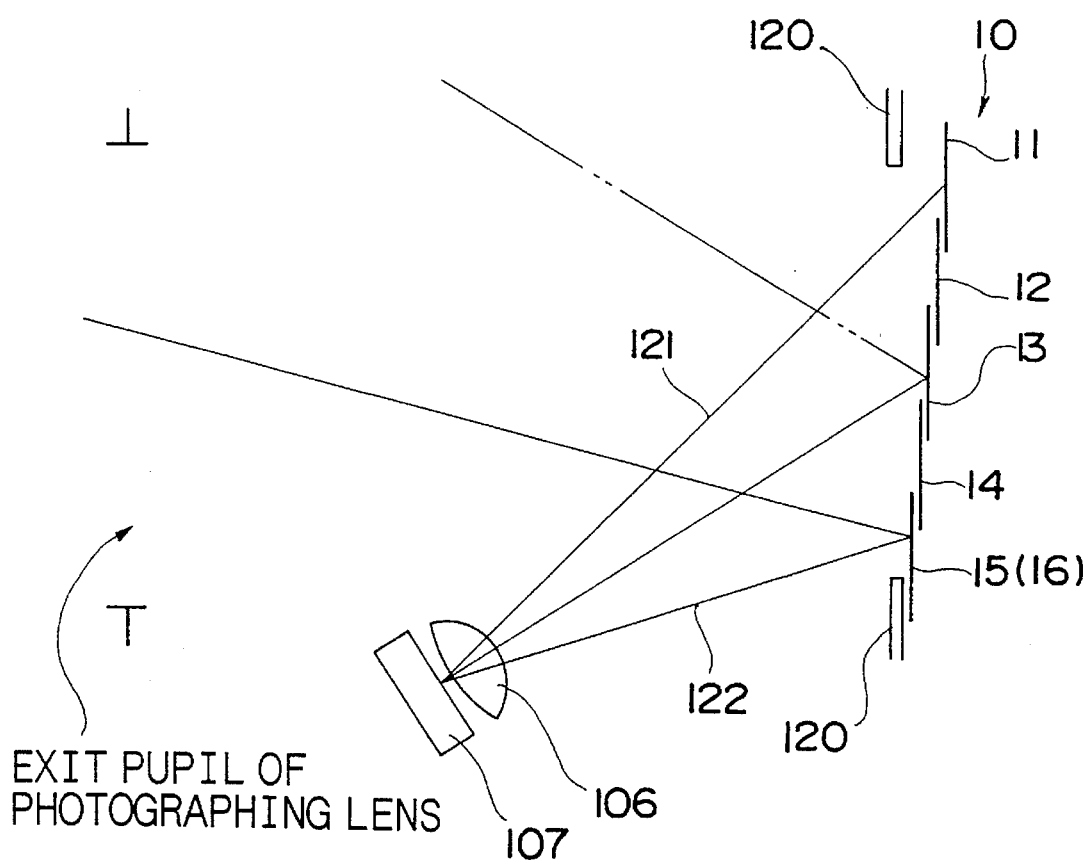
FIG. 3 is a schematic side view illustration of light reflected on the front curtain of a focal plane shutter, entering a light receiving device.

FIG. 3 illustrates how the light reflected on the front curtain 10 of the focal plane shutter 1 is directed to the light receiving device 107.

In this embodiment, the opening-forming blade 11 is disposed in the top position of the front curtain 10, and the other divided blades 12–15 are disposed overlapped with each other on the photographing lens-side of the opening-forming blade 11. As described above, because the photographing lens-side surface of the divided blades 12–15 is a high reflectance surface, sufficient amount of light can be directed to the light receiving device 107. Therefore, light amount of preliminary flashing can be decreased accordingly, and battery power consumption can be saved.

The photographing lens-side surface of the opening-forming blade 11 is overlapped by a shutter cover plate 120 and the divided blade 12. Thus, the effective height in the vertical direction of the area of the photographing lens-side surface of the opening-forming blade 11 exposed to the photographing lens-side is narrowed by the width of overlapping. And since part of the light from the subject is obstructed by the exit pupil of the photographing lens and the mirror box 105 of the camera body 100, the light reaching the opening-forming blade 11 which is located at the upper part of the focal plane shutter 1 is of less amount compared with the light reaching the other divided blades 12–14.

Figure 4:
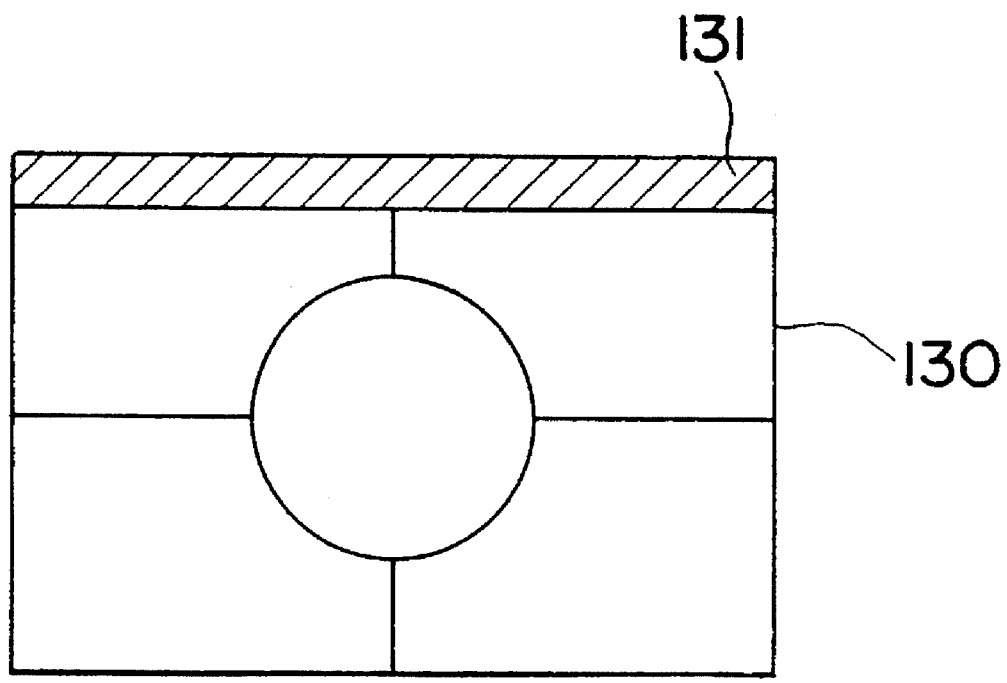
FIG. 4 is a schematic illustration of the light-receiving face of a light receiving device overlaid on a corresponding picture frame.

FIG. 4 is a schematic illustration of the light-receiving face of a light receiving device overlaid on a corresponding picture frame. Numeral 131 shows a region corresponding to the face of the opening-forming blade 11 exposed to the photographing lens-side. Because the picture frame 130 is in an upside-down fashion to the subject field, the region 131 corresponding to the opening-forming blade 11 is on the bottom side of the subject field. As described above, out of the photographing lens-side surface of the opening-forming blade 11, only the exposed face of narrowed vertical height contributes to the photometry, and the region 131 on the picture frame 130, corresponding to such a exposed face is a small area compared with the entire picture frame.

As readily understood from the above description, the exposed face to the photographing lens-side of the opening-forming blade 11 is initially of a small area, and the light reaching the opening-forming blade 11 is of less amount compared with the other divided blades 12–14. Furthermore, the possibility is extremely low that the main subject is positioned only in the region 131 of narrow stripe shape on the bottom side of the subject field. Therefore, even when the photographing lens-side surface of the blade 11 is a surface of low reflectance, effect on the photometric accuracy is negligibly small.

The light receiving device 107 which received reflected light from the front curtain 10 outputs electric signal corresponding to the amount of received light. The reflectance information of the subject field including whether a high reflectance object exists or not, is obtained based on the output from the light receiving device 107 and the output from the light receiving device 111.

In flashlight photographing, operation is such that the front curtain 10 of the focal plane shutter 1 is run downwards, main flashing is activated at the main flashing unit 109 of the flash 102 in a timing that the shutter 1 is completely opened, and the film 103 is exposed. In this operation, the reflected light from the subject passes through the photographing lens 101, is reflected on the film surface, and is received by the light receiving device 107 via the condenser lens 106. The light receiving device 107 outputs electric signal corresponding to the amount of received light. When the integrated value of the output from the light receiving device 107 reaches a value determined based on the reflectance information of the subject field, activation of the flash 102 is terminated.

When light adjustment is made, for example, in the case that a high reflectance object exist around the main subject, it is liable that exposure is adjusted to the high reflectance object, whereby under-exposure is caused for the main subject. By activating preliminary flashing at the flash 102, however, the reflectance information of the subject field including whether a high reflectance object exists or not, is known in advance. Thus, by making light adjustment based on this reflectance information, the main subject can be photographed with optimal exposure.

Second Embodiment

Figure 5:
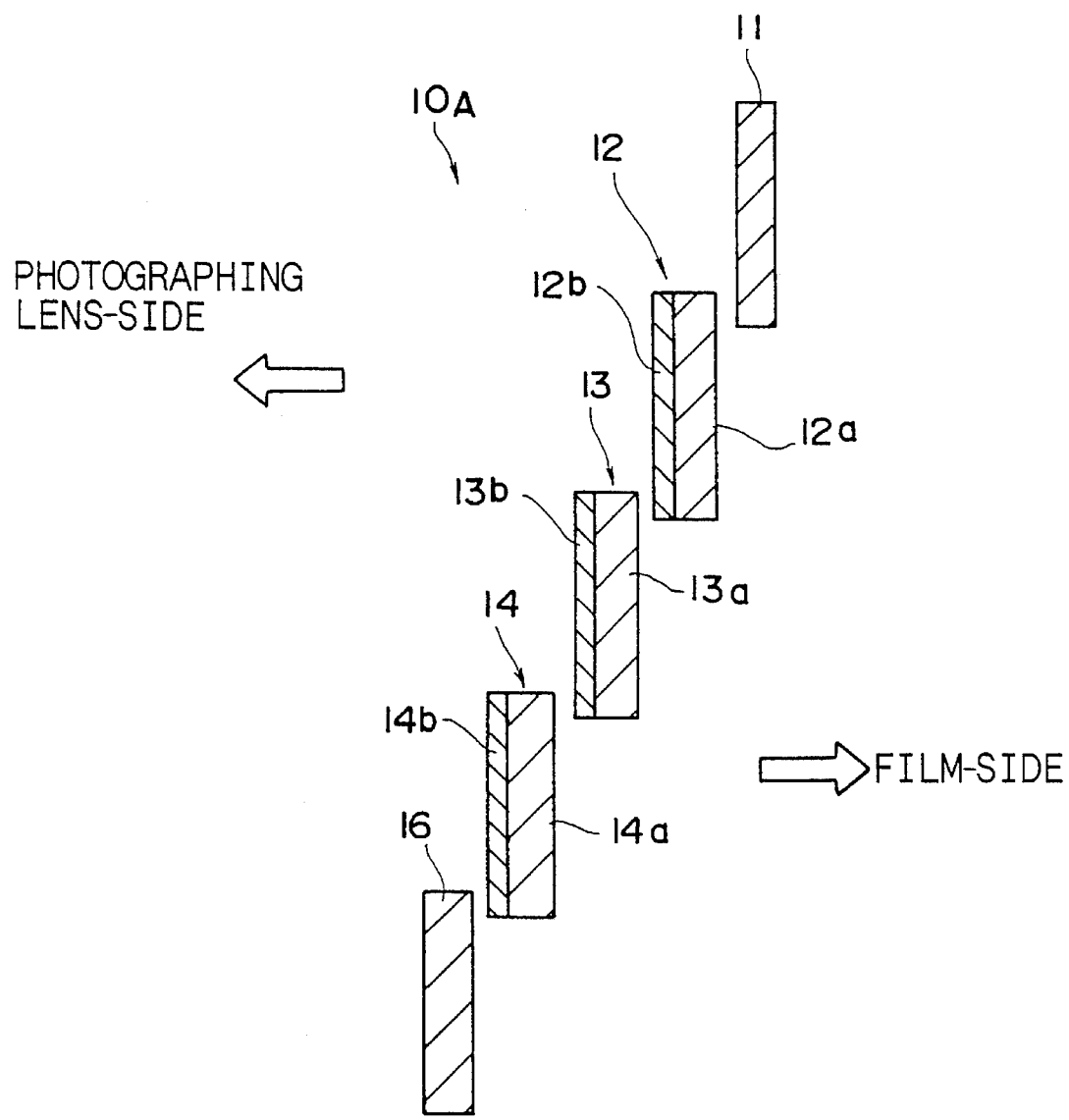
FIG. 5 is a schematic sectional illustration of divided blades forming a front curtain of a focal plane shutter, according to a second embodiment of the present invention.

Referring to FIG. 5, a second embodiment, according to the present invention, is described hereunder.

Referring to FIG. 3, in the case that the light receiving device 107 is disposed at the lower part of the mirror box 105, as described above, the upper four divided blades 11–14 out of the all the divided blades 11–15 forming the front curtain 10 of the focal plane shutter 1, has only the diffused light reflected on the photographing lens-side surface thereof directed to the light receiving device 107. On the other hand, the divided blade 15 at the bottom of the front curtain 10 has the regular reflected light 122 also directed to the light receiving device 107. Such regular reflected light 122 has greater amount of reflected light compared with the diffused reflected light, thereby causing considerable error in the result of photometry. Thus, in a camera with the light receiving device disposed within the mirror box, an arrangement is typically made that the regular reflected light directed to the light receiving device is shielded.

Accordingly, in the second embodiment of the present invention, not only the opening-forming blade 11 located at the top but also a divided blade 16 located at the bottom, of the front curtain 10, have the photographing lens-side surface thereof formed to be a low reflectance surface.

As shown in FIG. 5, blade body 16a of the divided blade 16 located at the bottom of the front curtain 10A is formed of a low reflectance material, for example, CFRP, and no surface treatment, such as painting, is applied to either of the photographing lens-side and the film-side surfaces thereof.

By giving the same numerals as the divided blades 11–14 of FIG. 1, description will be omitted for the other divided blades that are similar to those divided blades 11–14.

As described above, in this embodiment, because the photographing lens-side surface of the divided blade 16 located at the bottom of the front curtain 10, is a low reflectance surface, the amount of regular reflected light reflected on the divided blade 16 can be decreased. Thus, even when the light receiving device 107 is located at the bottom of the mirror box 105 (FIG. 2), deterioration of photometric accuracy due to excessive light amount can be prevented without disposing a shielding member for shielding the regular reflected light reflected on the divided blade 16.

In the respective embodiments described above, the divided blade has the blade body thereof arranged to be of CFRP. Alternatively, the divided blade may have an arrangement that, for example, the blade body is formed using metallic material such as aluminum and titanium, a low reflectance surface is formed on the entire surfaces of the blade body by applying thereto blacking painting of low reflectance, and a high reflectance surface is formed on the photographing lens-side surface of the opening-forming blade and the divided blade at the bottom by additionally applying thereto white or gray painting.

Figure 6:
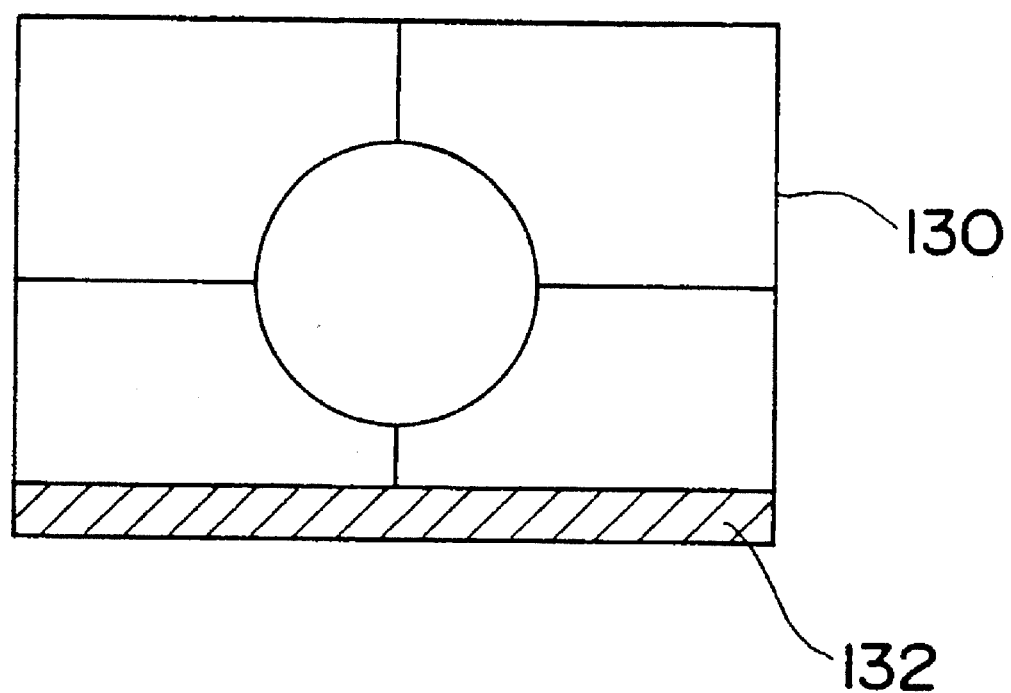
FIG. 6 is a schematic illustration of the light receiving face of a light receiving device overlaid on a corresponding picture frame.

Also, in the respective embodiments described above, examples has been shown for a focal plane shutter with each divided blade running downwards during the exposure operation. Alternatively, this invention can be applied to a shutter where the divided blades run upwards. In this case, the opening-forming blade is located at the bottom of the front curtain, and a region shown in FIG. 6 with numeral 132 (on the top side of the subject field) accordingly serves as the region corresponding to the opening-forming blade. Usually, the possibility is extremely low that the main subject is positioned only in the region 132 of narrow stripe shape on the top side of the subject field. Therefore, even when the photographing lens-side surface of this opening-forming blade is a surface of low reflectance, effect on the photometric accuracy is negligibly small. This invention can be also applied to a shutter running horizontally.

Furthermore, in the description above, examples has been shown where the distribution of reflectance for the subject field is detected and light adjustment is controlled, based on the output from the light receiving device 107. The present invention is also applicable to a camera of the type where exposure values are calculated based on the output from the light receiving device 107. In addition, examples have been discussed above for a focal plane shutter mounted on a single-lens reflex camera. The present invention is similarly applicable to focal plane shutters mounted on cameras other than the type of single-lens reflex camera.

I claim:

1. A focal plane shutter having a photo-receiving element for photometry, the shutter comprising:

a shutter curtain having a plurality of divided blades, each of the plurality of divided blades having a photographing lens-side surface and a film-side surface, wherein:

one of the plurality of divided blades is located at an end of said plurality of divided blades, said photographing lens-side surface of said one of said plurality of divided blades has a reflectance rate lower than a predetermined reflectance rate for directing regular reflected light to said photo-receiving element, and each of said plurality of divided blades other than said one divided blade having its photographing lens-side surface provided with a reflectance rate not lower than said predetermined reflectance rate for directing only diffused reflected light to said photo-receiving element.

2. A focal plane shutter according to claim 1, wherein:

said film-side surface of each of said plurality of divided blades is provided with a reflectance rate lower than said predetermined reflectance rate.

3. A focal plane shutter according to claim 2, wherein:

each of said plurality of divided blades comprises a blade body formed from a material with said photographing lens-side surface and said film-side surface each provided with a reflectance rate lower than said predetermined reflectance rate, and each of said plurality of divided blades other than said one divided blade has painting provided with a reflectance rate not lower than said predetermined reflectance rate applied to said photographing lens-side surface.

4. A focal plane shutter according to claim 3, wherein:

each of said plurality of divided blades has said blade body made of fiber reinforced plastics comprising carbon fiber, and each of said plurality of divided blades other than said one divided blades has white or gray painting applied to said photographing lens-side surface.

* * * * *